United States Patent
Sherwood et al.

(10) Patent No.: US 7,218,537 B2
(45) Date of Patent: May 15, 2007

(54) IN-RUSH CURRENT LIMITER

(75) Inventors: Lawrence E. Sherwood, Olathe, KS (US); Taras L. Dunduchenko, Lawrence, KS (US)

(73) Assignee: Honeywell International Inc., Morristown, NJ (US)

( * ) Notice: Subject to any disclaimer, the term of this patent is extended or adjusted under 35 U.S.C. 154(b) by 73 days.

(21) Appl. No.: 10/901,389

(22) Filed: Jul. 27, 2004

(65) Prior Publication Data

US 2006/0023475 A1    Feb. 2, 2006

(51) Int. Cl.
*H02M 7/10* (2006.01)
*G05F 1/40* (2006.01)

(52) U.S. Cl. .......................................... 363/49; 363/288

(58) Field of Classification Search ................... 363/49, 363/50; 323/282, 283, 286, 288, 241, 242, 323/901, 908; 713/500
See application file for complete search history.

(56) References Cited

U.S. PATENT DOCUMENTS

| | | | |
|---|---|---|---|
| 4,461,955 A | | 7/1984 | Bezdek |
| 5,282,125 A | * | 1/1994 | Dhyanchand et al. ........ 363/49 |
| 6,335,654 B1 | | 1/2002 | Cole |
| 6,356,468 B1 | * | 3/2002 | Havukainen et al. ......... 363/49 |
| 6,526,517 B1 | * | 2/2003 | Miller et al. ................ 713/500 |

2001/0020836 A1    9/2001    Joch

FOREIGN PATENT DOCUMENTS

DE        10255012 A1    6/2004

OTHER PUBLICATIONS

PCT Internatioanl Search Report: PCT/US2005/025427, Applicant Reference No. H0006690-5548, Nov. 28, 2005, EP International Search Authority, 7 pages.
DEI 1028 Voltage Clamping Circuit, Device Engineering Incorporated, pp. 1-5, 2002 Device Engineering Inc.

* cited by examiner

*Primary Examiner*—Jessica Han
(74) *Attorney, Agent, or Firm*—McDonnell Bochner Hulbert & Berghoff LLP (57) ABSTRACT

An in-rush current limiter and method is provided. The in-rush current limiter reduces the maximum current that is drawn during system startup of an avionics system. During startup, power is provided through a power supply bus to a plurality of avionics units that are each coupled to the power bus. To reduce the maximum current drawn by the avionics units during startup, the in-rush current limiter includes a current limiter controller, a charging circuit, and a switching circuit. Specifically, during system startup the main current path from the power supply bus is interrupted by the switching circuit while an alternate current path is connected through the charging circuit. During this charging the amount of current flowing through the charging circuit is limited to an acceptable level by a resistive element in the charging circuit.

24 Claims, 5 Drawing Sheets

IN-RUSH CURRENT LIMITER

FIELD OF THE INVENTION

This invention generally relates to avionics systems, and more specifically relates to aircraft avionics bus systems.

BACKGROUND OF THE INVENTION

Modern aircraft have increasingly sophisticated control and communication systems. Included in many modern aircraft is an power supply bus that provides power and communication links between a variety of navigation, control and communication equipment. As the complexity of the aircraft has increased, the avionics system requirements have likewise increased. Furthermore, because of the numerous critical operations supported by the power supply bus, the reliability and performance of the power supply bus is of utmost importance.

One function provided by the power supply bus is to distribute power to various avionics components connected to the bus. For example, the power supply bus can provide operational power for navigation and communication radios, gauges, sensors and display units. The ability of the power supply bus to reliably power these avionics components is one key in the overall reliability of the aircraft.

One significant issue in power supply bus reliability is the large currents that can occur on system startup. In a typical system, the power supply bus is heavily loaded. On system startup, a large in rush of current is associated with turning on the power supply bus and its associated avionic components. This in-rush current can be 100 times the normal operating current of the power supply bus. Such an in-rush current can prematurely wear switches and other devices that make up the bus, and thus can reduce the reliability of the bus. For example, large in-rush currents associated with turning on an avionics master switch can actually damage the master switch itself.

Unfortunately, current avionic power supply bus systems have no reliable method for reducing the effects of large in-rush currents associated with system startup. Thus, what is needed is a system and method for limiting in-rush current on system startup of an avionics bus system.

BRIEF SUMMARY OF THE INVENTION

The present invention provides an in-rush current limiter and method. The in-rush current limiter reduces the maximum current that is drawn during system startup of an avionics system. During startup, power is provided through a power supply bus to a plurality of avionics units that are each coupled to the power bus. To reduce the maximum current drawn by the avionics units during startup, the in-rush current limiter includes a current limiter controller, a charging circuit, and a switching circuit. The current limiter controller senses system startup and controls the charging circuit and the switching circuit to reduce the in-rush current. Specifically, during system startup the main current path from the power supply bus is interrupted by the switching circuit while an alternate current path is connected through the charging circuit. The current flowing through the charging circuit and alternate current path and is provided to a corresponding avionics unit, where it charges capacitance on an associated avionics unit. During this charging the amount of current flowing through the charging circuit is limited to an acceptable level by a resistive element in the charging circuit. When the charge on the avionics unit has reached a defined level, or when a set time period is reached, the alternative current path is interrupted by the charging circuit, and the main current path from the power supply bus is restored. Because the capacitance on the avionics units is charged prior to the main current path restoration, the in-rush current at this time will be within acceptable levels. Thus, the in-rush current limiter reduces the in-rush current on the power supply bus during system startup, while not interfering with normal operation of the bus or the avionics units coupled to the bus.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

Figure 1:
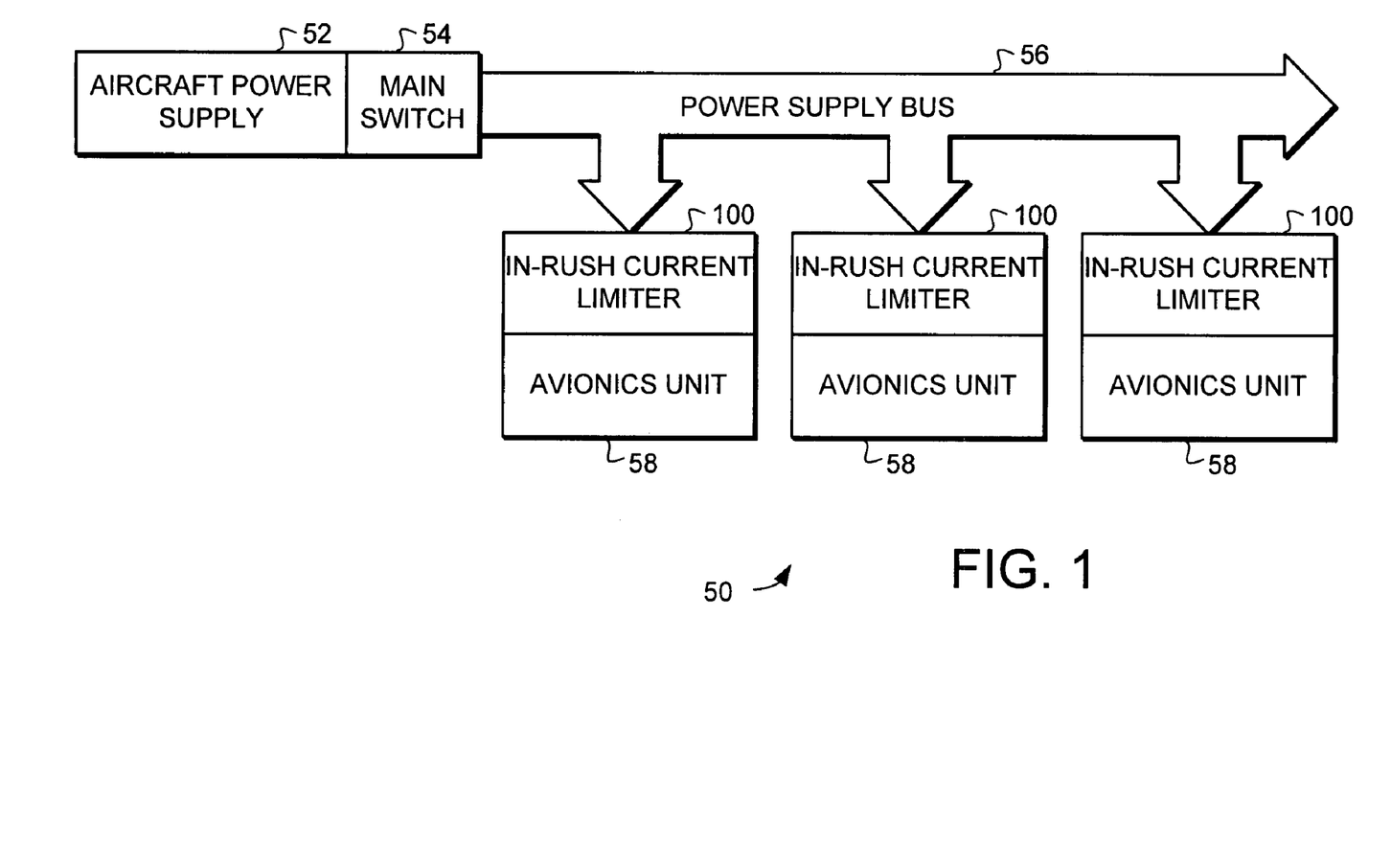
FIG. 1 is a schematic view of an avionics bus system.

The present invention provides an in-rush current limiter and method. The in-rush current limiter reduces the maximum current that is drawn during system startup of an avionics system. Turning now to FIG. 1, a schematic view of an avionics system 50 is illustrated. The avionics system 50 includes an aircraft power supply 52, a main switch 54, an avionics power supply bus 56, and a plurality of avionics units 58. The main function of the power supply bus 56 is to distribute power to the various avionics units 58. For example, the avionics units 58 can comprise navigation and communication radios, gauges, control devices, sensors and display units, which are all powered through the power supply bus 56.

Power to the avionics units 58 is controlled with the main switch 54. When the main switch 54 is turned on, power is delivered to the avionics units 58 though the power supply bus 56. In accordance with the embodiments of the invention, the in-rush current limiters 100 serve to reduce the in-rush current that would otherwise occur when the main switch 54 is turned on. Reducing the current helps avoid premature wear and damage to the main switch 54 and power supply bus 56. To reduce the maximum current drawn by the avionics units 58 during startup, the in-rush current limiters 100 provide an alternative current path from the power supply bus 56 where current is limited with an appropriate resistive element. When capacitance on the avionics units 58 is charged, the alternative current path is interrupted by the charging circuit, and the main current path from the power supply bus 56 is restored. Thus, the in-rush current limiters 100 reduce the in-rush current on the power supply 43 bus during system startup, while not interfering with normal operation of the power supply bus 56 or the avionics units 58.

Figure 2:
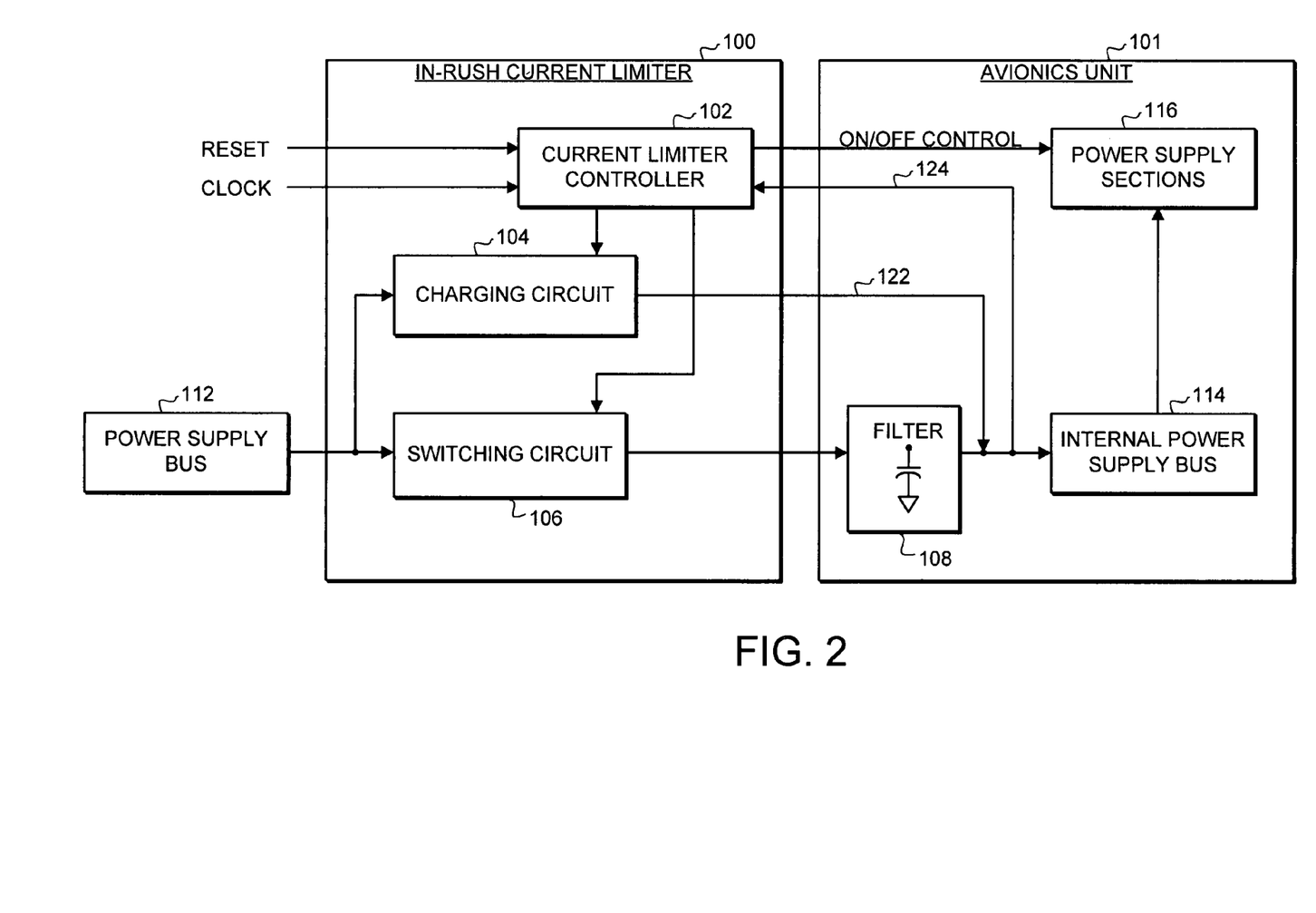
FIG. 2 is a schematic view of an in-rush current limiter and avionics unit in an avionics bus system.

Turning now to FIG. 2, an in-rush current limiter 100 in accordance with an exemplary embodiment of the present invention is illustrated. The in-rush current limiter 100 serves to reduce the maximum current drawn from power supply bus 112 by the avionics unit 101 during startup. The in-rush current limiter 100 includes a current limiter controller 102, a charging circuit 104, and a switching circuit 106. The current limiter controller 102 senses system startup and controls the charging circuit 104 and the switching circuit 106 to reduce the in-rush current. Specifically, during system startup the main current path from the power supply bus 112 is interrupted by the switching circuit 106 while an alternate current path is connected through the charging circuit 104. The current flowing through the charging circuit and alternate current path is provided to the avionics unit 101, where it charges capacitance on the avionics unit 101. During this charging the amount of current flowing through the charging circuit 104 is limited to an acceptable level by a resistive element in the charging circuit 104. When the charge on the avionics unit 101 has reached a defined level, or when a set time period is reached, the alternative current path is interrupted by the charging circuit 104, and the main current path from the power supply bus 112 is restored. Because the capacitance on the avionics unit 101 is charged prior to the main current path restoration, the in-rush current at this time will be within acceptable levels.

In the embodiment illustrated in FIG. 2, the avionics unit 101 includes filter 108, an internal power supply bus 114 and power supply sections 116. It should be noted that these are just common examples of the type of components found in avionics units, and that typical units would include additional components, circuits and devices depending upon the particular application and design. In general, the filter 108 serves to prevent noise from the power supply bus 112 from passing into sensitive components in the avionics unit 101 and vice versa. Power is delivered to the internal supply bus 114 through the filter 108. The internal supply bus 114 delivers power to the various functional components in the avionics unit, with the particular type and configuration of these components depending upon the type of avionics unit 101. Specifically, the internal power supply bus 114 delivers power to power supply sections 116 that serve to power the individual functional components that make up the power avionics unit 114. For example, the power supply sections 116 will down-convert (or up-convert) the power from the voltage (e.g., 28 volts) found on the power supply bus 114 to the voltage needed for the internal circuitry of the avionics units (e.g., 3.3, 5, +/−12 and +/−15 volts). Thus, the filter 108, the internal power supply bus 114 and the power supply sections 116 serve to deliver power from the power supply bus 112 to the individual functional components in the avionics unit 116.

As stated above, the filter 108 serves to prevent noise from the power supply bus 112 from getting into the avionics unit 101 and vice versa. In many cases, filter 108 would include a plurality of filters, each designed to provide a particular type of protection for the avionics unit 101 and the other components. For example, one filter can comprise two EMI designed to reduce current flow through the filter by paralleling the filters, and to separate noise circuitry such as backlights from the internal power supply bus 114.

Filter 108 will generally include a relatively large amount of capacitance. For example, a typical EMI filter can include several large capacitors that are an integral part of the filter. When the power has been removed from the capacitor for a significant length of time all charge will dissipate from the capacitors. When no charge is on a capacitor, and voltage is applied, the capacitor will act as a current sink with no real significant impedance. As such, when startup occurs, the filter 108 capacitors can drain a relatively large amount of current. This in-rush current will continue until a significant charge has been stored on the filter 108 capacitors causing the voltage on the capacitors to rise. As discussed above, unless addressed, this current can greatly exceed the normal operating current on the power supply bus 112, and can lead to damage on the power supply bus 112 and its associated elements.

The in-rush current limiter 100 serves to reduce the in-rush current by providing an alternative current path from the power supply bus 112 to the capacitors on the filter 108, with that alternative current path including resistive elements designed to limit the in-rush current. The current limiter controller 102 controls the operation of the charging circuit 104 and the switching circuit 106 to facilitate in-rush current reduction. Specifically, when the power supply bus 112 is started up, the reset signal input to the current limiter controller is asserted. In response, the current limiter controller 102 directs the switching circuit 106 to interrupt the main current path between the power supply bus 112 and the filter 108. At the same time, the current limiter controller 102 directs the charging circuit 104 to connect the alternative current path between power supply bus 112 and the filter 108. Thus, current flows over line 122 to the filter 108, where it charges the capacitors on filter 108. During this charging the amount of current flowing through the charging circuit 104 is limited to an acceptable level by a resistive element in the charging circuit 104. The voltage on the capacitors is fed back to the current limiter controller 102 over line 124. When the voltage on the capacitor reaches a defined point, the current limiter controller 102 directs the charging circuit 104 to interrupt the alternative current path. At the same time, the current limiter controller 102 directs the switching circuit 106 to restore the main current path between the power supply bus 112 and the filter 108. Because the capacitors on filter 108 are charged at this point, the in-rush current associated with the connecting of the main current path will be limited to acceptable levels. Furthermore, because the main current path is restored, the avionics unit 101 can function normally.

The current limiter controller 102 also receives a clock signal. The current limiter controller 102 uses the clock signal to assure that the main current path is not interrupted for an excessive amount of time. Specifically, the clock signal is used to measure the time the alternative current path is connected. When a defined period of time has been reached, the clock signal causes the current limiter controller 102 to switch to the main current path if it has not already done so as a result of voltage feedback on line 124. Thus, the clock signal serves as a back up, assuring that the main current path is eventually restored even if current leakage or other issues cause the voltage on the capacitors to never reach the predetermined level. Thus, the current limiter controller 102 causes the main current path to be restored and the alternative current path interrupted when either the charge on the filter capacitors has reached a defined level or when a set time period has been reached.

As will be described in greater detail below, the clock signal, voltage feedback and current limiter controller 102 can be configured to implement a staggered startup of avionics units in the system, thus further limiting the in-rush current at startup.

Figure 3:
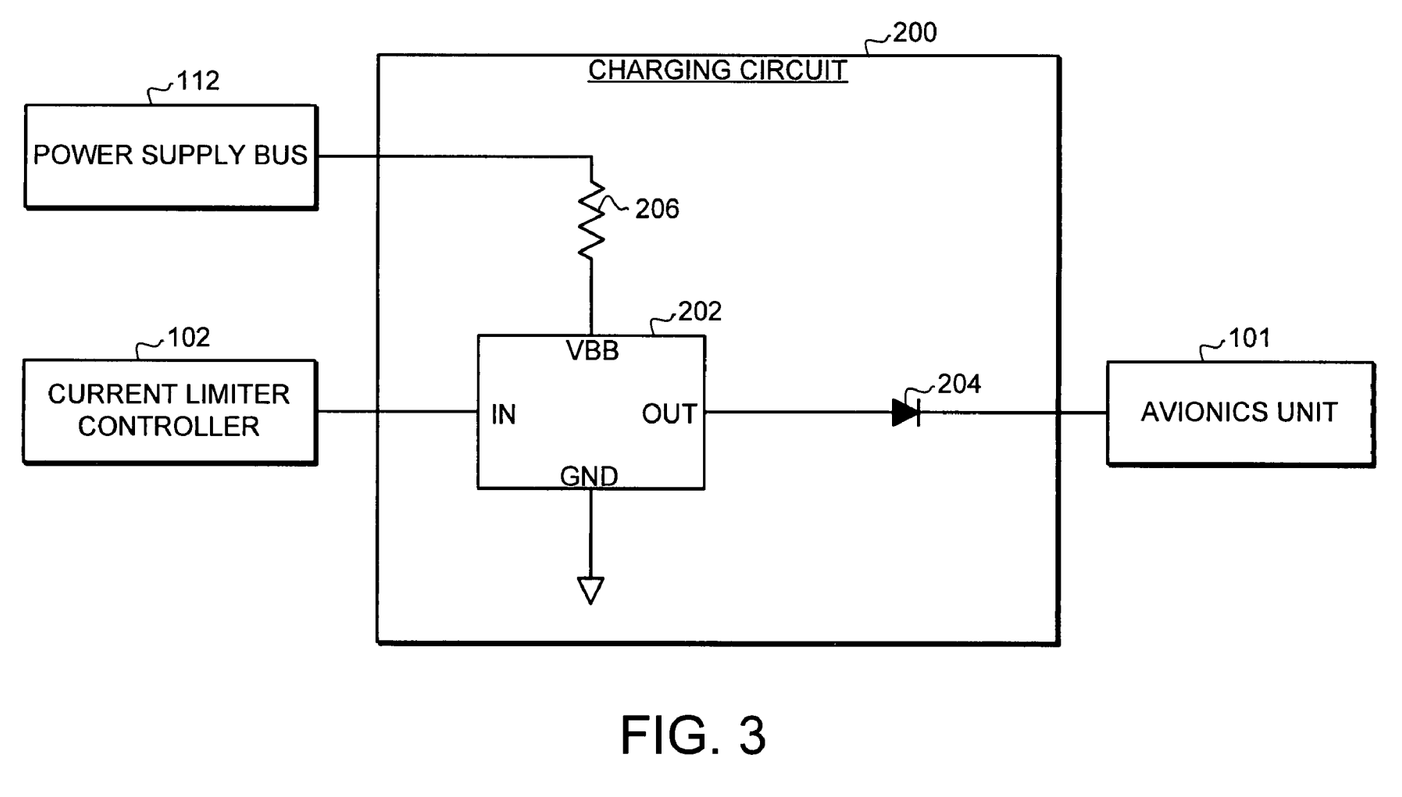
FIG. 3 is a schematic view of charging circuit in accordance with a preferred embodiment of the present invention.

Turning now to FIG. 3, an exemplary charging circuit 200 is illustrated schematically. The charging circuit 200 is exemplary of the type of charging circuit that can be used in the in-rush current limiter 100 of FIG. 2. The charging circuit 200 includes an integrated switch 202, a diode 204, and a resistor 206. The integrated switch 202 can be implemented with an Infineon Smart Switch BTS 462. The charging circuit 200 provides an alterative current path from the power supply bus to the avionics unit, and is controlled by the current limiter controller 102. Specifically, when the signal from the current limiter controller 102 is not asserted, the alterative current path from the power supply bus 112 to the avionics unit 101 is interrupted, and no current can pass. When the signal from the current limiter controller is asserted, the switch 202 connects the VBB terminal to the out terminal. This establishes the alternative current path between the power supply bus 112 and the avionics unit 101. The resistor 106 serves to limit the current flowing through the alternative current path to an acceptable level. Thus, even though the uncharged capacitors in avionics unit 101 have no significant real impedance, the current from the power supply bus 112 to the avionics unit 101 will be limited. It should be noted that in some applications additional resistors could be used depending on application requirements. The diode 204 serves to ensure that current does not flow back through the alternative current path when the main current path is reconnected, and can be implemented with one or more diodes.

Figure 4:
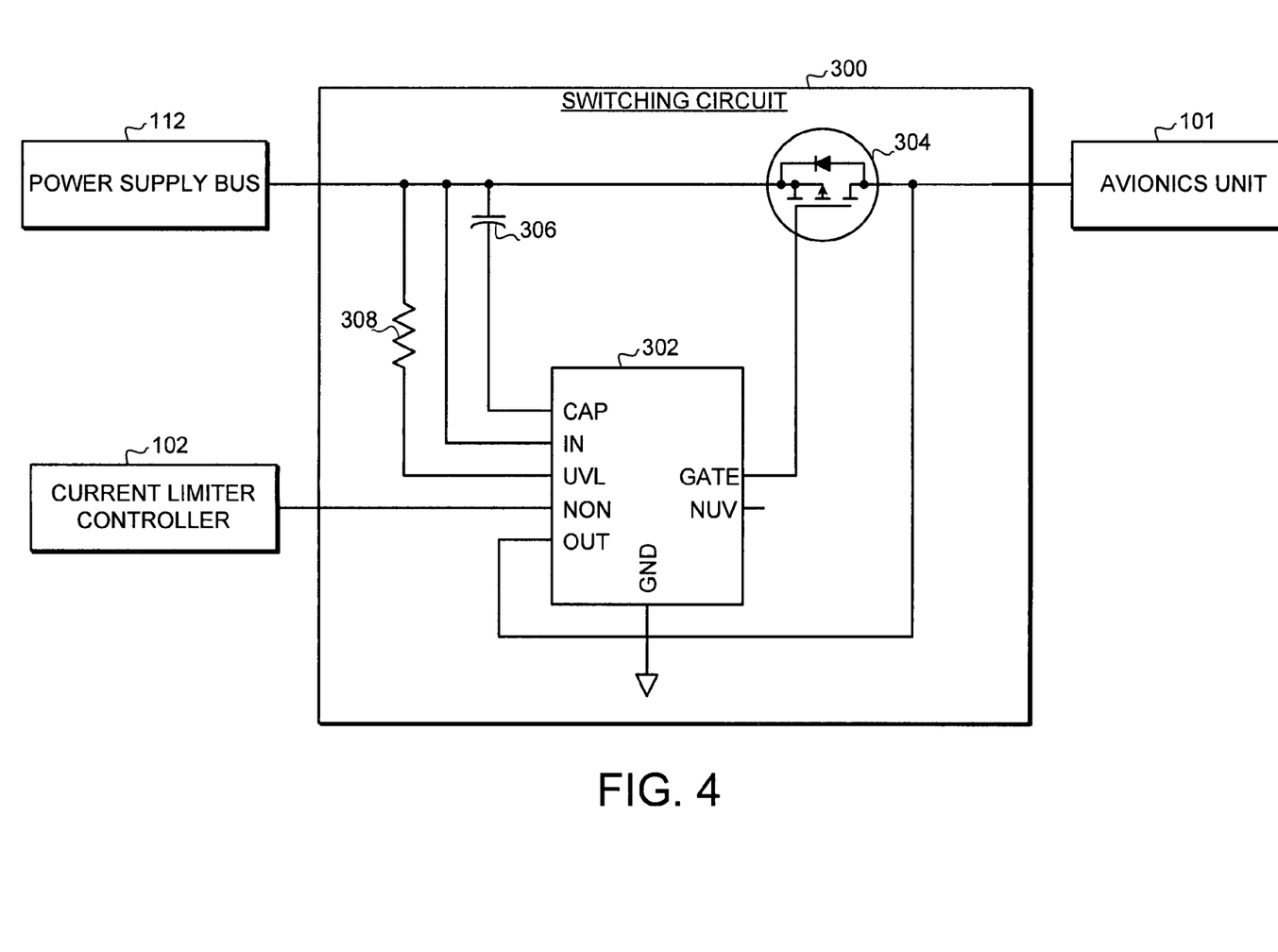
FIG. 4 is a schematic view of switching circuit in accordance with a preferred embodiment of the present invention.

Turning now to FIG. 4, an exemplary switching circuit 300 is illustrated schematically. The switching circuit 300 is exemplary of the type of switching circuit that can be used in the in-rush current limiter of FIG. 1. The switching circuit 300 includes a voltage clamping circuit 302, a transistor 304, a capacitor 306 and a resistor 308. The voltage clamping circuit 302 can be implemented with a DEI 1028 available from Device Engineering Incorporated and the transistor 304 can be implemented with a P-channel MOSFET using International rectifier IRF5210. The switching circuit 300 serves to selectively connect the main current path between the power supply bus 112 and the avionics unit 101 by selectively turning on and off the transistor 304. When the transistor 304 is off, the main current path between the power supply bus 112 and the avionics unit 101 is interrupted. When the transistor 304 is on, the main current path is restored.

Furthermore, the switching circuit 300 provides protection for the avionics units from high voltage spikes (up to 100V) on the power supply bus 112 by using the voltage clamping circuit 302 to control transistor 304 such that voltage is clamped at 34 volts. The resistor 308 serves as a programmable under-voltage lockout, defining a threshold level (e.g., at about 9.2–9.5 volts).

Finally, the switching circuit 300 provides a soft start delay. The capacitor 306 provides a programmed delay (e.g., 15 ms) and provides control on the circuitry when the current control limiter is not yet functioning. During startup, the transistor 304 is in the off state. The current limiter controller 102 comes up in after a short delay (e.g., 10–12 ms), providing a soft start delay that helps keep the switching circuit 300 off to the moment when current limit controller 102 can take control of the circuit.

Thus, switching circuit 300 serves to selectively connect and interrupt the main current path between the power supply bus 112 and the avionics unit 101.

Figure 5:
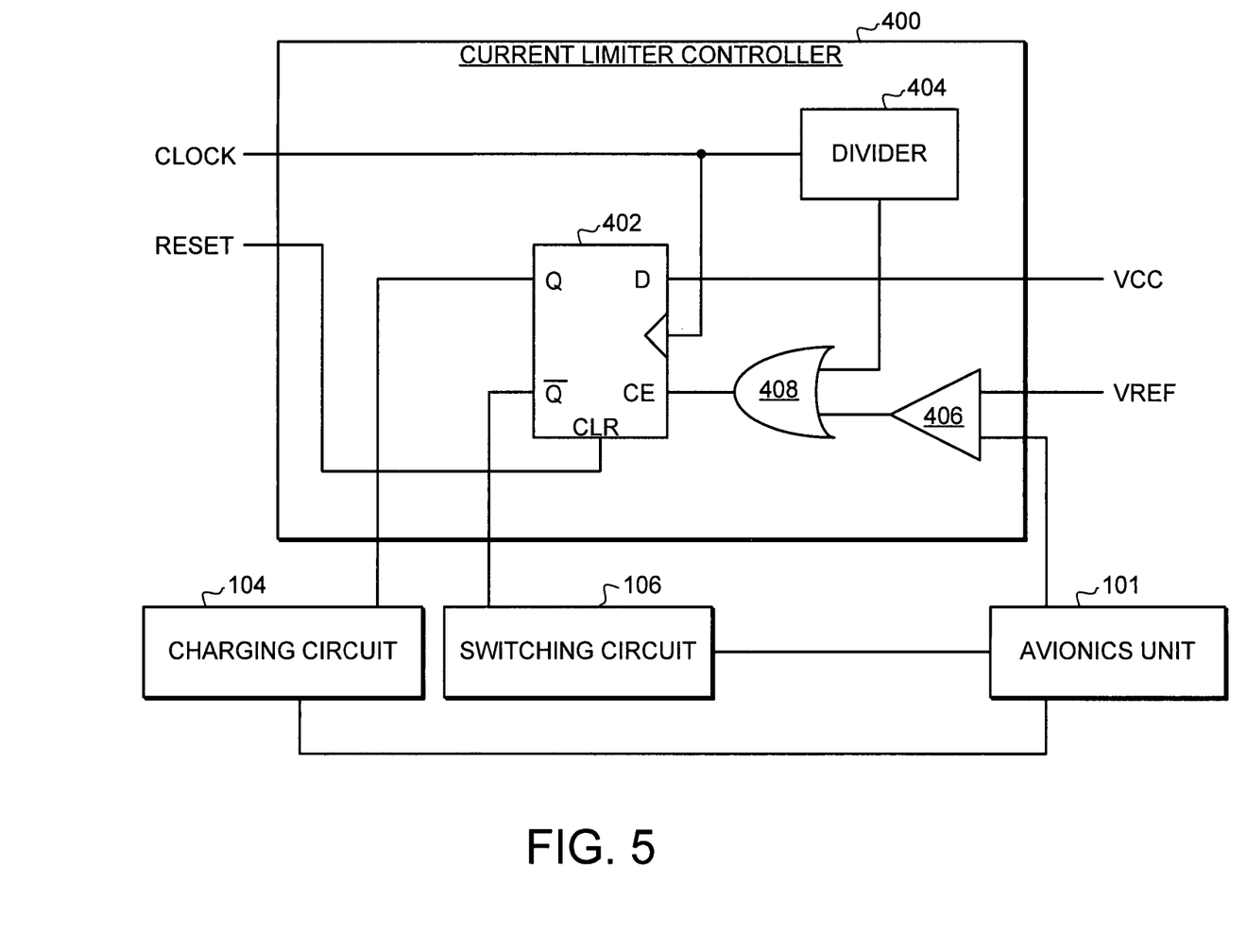
FIG. 5 is a schematic view of current limiter controller in accordance with a preferred embodiment of the present invention.

Turning now to FIG. 5, a current limiter controller 400 is illustrated schematically. The current limiter controller 400 is a simplified example of the type of controller that can be used in the in-rush current limiter 100 of FIG. 1. The current limiter controller 400 includes a flip-flop 402, a divider 404, a comparator 406 and an OR gate 408. The current limiter controller can be implemented with these discrete elements, but can also be implemented with a programmable device such as a PLD in combination with one or more discrete elements. In that implementation, the functioning of the flip-flop 402, divider 404, and OR gate 408 would be implemented by programming the appropriate functionality into the PLD device, and comparator 406 would be implemented as a separate discrete element.

The current limiter controller 400 senses system startup and controls the charging circuit 104 and the switching circuit 106 to reduce the in-rush current to the avionics unit 101. Specifically, when system startup occurs, the reset input signal is enabled, causing the flip-flop 402 to clear. The Q output of flip-flop 402 is passed to the charging circuit 104, where it causes the alternative current path to be connected. At the same time, the Q bar output of the flip flop 402 is passed to the switching circuit 106, causing the main current path to be interrupted. This facilitates charging of the capacitance on the avionics unit 101 through the charging circuit 104. During this charging the amount of current flowing through the charging circuit 104 is limited to an acceptable level by a resistive element in the charging circuit 104.

The voltage on the capacitors in avionics unit 101 is fed back to the comparator 406 where it is compared to a reference voltage VREF. When the voltage on the capacitors reaches a defined point, comparator outputs a high signal to OR gate 408. This causes the output of OR gate 408 to go high, which is passed to the CE input of flip-flop 402. This causes the Q and Q bar outputs of the flip flop 402 to toggle on the next clock cycle. This causes the charging circuit 104 to interrupt the alternative current path, and the switching circuit 106 to restore the main current path. Because the capacitors on avionics unit 101 are charged at this point, the in-rush current associated with the connecting of the main current path will be limited to acceptable levels. Furthermore, because the main current path is restored, the avionics unit 101 can function normally.

Preferably, the reference voltage VREF is selected to be something less than you would expect the capacitors to charge to, and the timing is likewise selected based on calculations using the series resistance, and the total capacitance charged.

Specifically, avionics units are desired to properly function if the aircraft power supply voltage is within a specified range (e.g., 10V to 33V). An under-voltage shutdown is chosen below that range (e.g., 9.2V to 9.5V). The level of the threshold comparator would generally be chosen to be below the shutdown, but high enough to decrease the in-rush current to an acceptable level. For example, with a shutdown range of 9.2 volts, a threshold level of 7 volts can be used. This can be implemented using a comparator with a built in reference voltage and a voltage divider.

The current limiter controller 400 also receives a clock signal. The current limiter controller 400 uses the clock signal to assure that the main current path is not interrupted for an excessive amount of time. Specifically, the clock signal is passed to a divider 404 and the flip-flop 402. The divider 404 and clock rate are used determine the time period at which the main current path with be restored, regardless of voltage on the avionics unit. When that time period is elapsed, the output of the divider is asserted and passed to the OR gate 408. Again, this causes the Q and Q bar outputs of the flip flop 402 to toggle on the next clock cycle if they have not already done so. This again causes the charging circuit 104 to interrupt the alternative current path, and the switching circuit 106 to restore the main current path. Thus, the clock signal serves as a back up, assuring that the main current path is eventually restored even if current leakage or other issues cause the voltage on the capacitors to never reach the predetermined level. Thus, the current limiter controller 400 causes the main current path to be restored and the alternative current path interrupted when either the charge on the filter capacitors has reached a defined level or when a set time period has been reached.

Again, the divider 404 and clock rate used determine the time period at which the main current path will be restored. For example, if a 32.768 KHz clock is used, along with a divide by 2^13 divider, the main current path will be restored after 256 ms. Thus, by selecting appropriate dividers and/or clock rate the amount of time allowed before switching can be tailored for a particular application.

Furthermore, by tailoring the divider and/or clock signal of individual controllers differently, the various avionics units on the system can be implemented with a staggered startup. In a staggered startup, different avionics units are switched to their main current path at different times. In this embodiment, it may also be desirable to adjust the reference voltage and comparator to also stagger the switch times that result from the voltages reaching a defined level. Such a staggered startup will offer increased in-rush current protection for the bus system.

The present invention provides thus an in-rush current limiter and method. The in-rush current limiter reduces the maximum current that is drawn during system startup of an avionics system. During startup, power is provided through a power supply bus to a plurality of avionics units that are each coupled to the power bus. To reduce the maximum current drawn by the avionics units during startup, the in-rush current limiter includes a current limiter controller, a charging circuit, and a switching circuit. The current limiter controller senses system startup and controls the charging circuit and the switching circuit to reduce the in-rush current. Specifically, during system startup the main current path from the power supply bus is interrupted by the switching circuit while an alternate current path is connected through the charging circuit. The current flowing through the charging circuit and alternate current path and is provided to a corresponding avionics unit, where it charges capacitance on an associated avionics unit. During this charging the amount of current flowing through the charging circuit is limited to an acceptable level by a resistive element in the charging circuit. When the charge on the avionics unit has reached a defined level, or when a set time period is reached, the alternative current path is interrupted by the charging circuit, and the main current path from the power supply bus is restored. Because the capacitance on the avionics units is charged prior to the main current path restoration, the in-rush current at this time will be within acceptable levels. Thus, the in-rush current limiter reduces the in-rush current on the power supply bus during system startup, while not interfering with normal operation of the bus or the avionics units coupled to the bus.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. An in-rush current limiter for limiting in-rush current from a power supply bus to an avionics unit during system startup, the in-rush current limiter comprising:
   a switching circuit, the switching circuit interrupting a main current path from the power supply bus to the avionics unit during system startup, the switching circuit comprising a switching transistor in the main current path, the switching transistor controlled by a clamping integrated circuit to limit voltage at the avionics unit;
   a charging circuit, the charging circuit connecting an alternative current path from the power supply bus to the avionics unit during system startup, the charging circuit including a resistive element to limit current in the power supply bus to an acceptable level during system startup; and
   a limiter controller, the limiter controller sensing system startup and controlling the charging circuit and the switching circuit such that the charging circuit interrupts the alternative current path to prevent current flow through the alternative current path and the switching circuit connects the main current path through the switching transistor when the avionics unit has been charged to a defined level.

2. The current limiter of claim 1 wherein the avionics unit includes a filter, the filter including at least one capacitor and wherein the charging circuit charges the at least one capacitor though the alternative current path.

3. The current limiter of claim 1 wherein the limiter controller further controls the charging circuit and switching circuit such that the charging circuit interrupts the alternative current path and the switching circuit connects the main current path after charging for a defined time period.

4. The current limiter of claim 3 wherein the defined time period is selected to result in a staggered start as compared to other avionics units coupled to the power system bus.

5. The current limiter of claim 1 wherein the limiter controller includes a comparator, and wherein the comparator compares a voltage on the avionics unit to a reference voltage to determine when the charging circuit should interrupt the alternative current path and the switching circuit should connect the main current path.

6. The current limiter of claim 5 wherein the reference voltage is selected to result in a staggered start as compared to other avionics units coupled to the power system bus.

7. The current limiter of claim 1 wherein the switching circuit further implements a soft startup of the avionics unit by delaying turning on the switching transistor until the limiter controller has started up.

8. An apparatus comprising:
   a plurality of avionics units coupled to a power supply bus;
   a plurality of in-rush current limiters coupled to the power supply bus, each of the plurality of in-rush current limbers corresponding to one of the plurality of avionics units, the plurality of in-rush current limiters each including:
      a switching circuit, the switching circuit interrupting a main current path from the power supply bus to its corresponding avionics unit during system startup, the switching circuit comprising a switching transistor in the main current path, the switching transistor controlled by a clamping integrated circuit to limit voltage at the avionics unit provide an under-voltage lockout;

a charging circuit, the charging circuit connecting an alternative current path from the power supply bus to its corresponding avionics unit during system startup, the charging circuit including a resistive element to limit current in the power supply bus to an acceptable level during system startup; and a limiter controller, the limiter controller sensing system startup and controlling the charging circuit and the switching circuit such that the charging circuit interrupts the alternative current path to prevent current flow through the alternative current path and the switching circuit connects the main current path through the switching transistor when its corresponding avionics unit has been charged to a defined level or when the corresponding avionics unit has been charged for a defined time period.

9. The apparatus of claim 8 wherein the limiter controller for each in-rush current limiter further controls the charging circuit and switching circuit such that the charging circuit interrupts the alternative current path and the switching circuit connects the main current path after charging for a defined time period.

10. The apparatus of claim 9 wherein the defined time period is individually selected for each of the plurality of avionics units to result in a staggered start forte plurality of avionics units.

11. The apparatus of claim 8 wherein the limiter controller for each in-rush current limiter includes a comparator, and wherein the comparator compares a voltage on the avionics unit to a reference voltage to determine when the charging circuit should interrupt the alternative current path and the switching circuit should conned the main current path.

12. The apparatus of claim 11 wherein the reference voltage is selected for each of the plurality of avionics units to result in a staggered start for the plurality of avionics units.

13. The apparatus of claim 8 wherein the plurality of avionics units comprise at least one navigation device, at least one display unit, and at least one communication radio.

14. The current limiter of claim 1 wherein the avionics unit comprises a navigation device.

15. The current limiter of claim 1 wherein the avionics unit comprises a display unit.

16. The current limiter of claim 1 wherein the avionics unit comprises a communication radio.

17. An in-rush current limiter for limiting in-rush current from a power supply bus to in avionics unit during system startup, the in-rush current limiter comprising:

a switching circuit, the switching circuit including a switching transistor in a main current path from the power supply bus to the avionics unit, the switching transistor adapted to interrupt the main current pat during system startup, the switching circuit further comprising a clamping circuit adapted to control the switching transistor to limit voltage at the avionics unit; and a charging circuit, the charging circuit adapted to connect an alternative current path from the power supply bus to the avionics unit during system startup; and a limiter controller, the limiter controller adapted to sense system startup and control the charging circuit and the switching circuit such that the charging circuit interrupts the alternative current path to prevent current flow through the alternative current path and the switching circuit connects the main current path through the switching transistor when the avionics unit has been charged.

18. The current limited of claim 17 wherein the limiter controller is adapted to connect the main current path through the switching transistor when the avionics unit has either been charged to a defined level or has charged for a defined time period.

19. The current limiter of claim 17 wherein the switching transistor is further controlled by the clamping integrated circuit to provide an under-voltage lockout of the avionics unit.

20. The current limiter of claim 17 wherein the charging circuit includes a resistive element in the alternative current path to limit current in the bus system to an acceptable level during bus startup.

21. The current limiter of claim 17 wherein the charging circuit includes a switch in the alternative current path, The switch controlled by the limiting controller to interrupt the alternative current path to prevent current flow through the alternative current path when the avionics unit has been charged.

22. The current limiter of claim 17 wherein the limiter controller compares a voltage on a capacitor to a reference voltage to determine when the avionics unit has been charged.

23. The current limiter of claim 17 wherein the limiter controller receives a clock signal to determine when the avionics unit has been charged.

24. The current limiter of claim 17 wherein the switching circuit further implements a soft startup by delaying turning on the switching transistor until the limiter controller has started up.

\* \* \* \* \*

UNITED STATES PATENT AND TRADEMARK OFFICE
CERTIFICATE OF CORRECTION

PATENT NO. : 7,218,537 B2 Page 1 of 1
APPLICATION NO. : 10/901389
DATED : May 15, 2007
INVENTOR(S) : Lawrence E. Sherwood It is certified that error appears in the above-identified patent and that said Letters Patent is hereby corrected as shown below:

Col. 9, line 25, replace "staggered start forte plurality" with --staggered start for the plurality--

Col. 9, line 32, replace "circuit should conned the main" with --circuit should connect the main--

Col. 9, line 47, replace "supply bus to in avionics" with --supply bus to an avionics--

Col. 10, line 2, replace "main current pat" with --main current path--

Col. 10, line 18, replace "The current limited of claim" with --The current limiter of claim--

Col. 10, lines 32-33, replace "current path, The switch" with --current path, the switch--

Signed and Sealed this

Twentieth Day of November, 2007

JON W. DUDAS
*Director of the United States Patent and Trademark Office*